(12) United States Patent
Lisenko (10) Patent No.: US 7,658,840 B2
(45) Date of Patent: Feb. 9, 2010

(54) LOCKING FILTER ASSEMBLY

(76) Inventor: Robert Lisenko, 151 Sandquist Cir., Hamden, CT (US) 06514

( * ) Notice: Subject to any disclaimer, the term of this patent is extended or adjusted under 35 U.S.C. 154(b) by 0 days.

(21) Appl. No.: 12/234,871

(22) Filed: Sep. 22, 2008

(65) Prior Publication Data
US 2009/0078624 A1    Mar. 26, 2009

Related U.S. Application Data

(60) Provisional application No. 60/974,233, filed on Sep. 21, 2007.

(51) Int. Cl.
*B01D 35/30* (2006.01)
(52) U.S. Cl. ............... 210/91; 55/490; 210/232; 210/443; 210/450; 70/21; 70/77
(58) Field of Classification Search .............. 210/85, 210/91, 94, 232–235, 440, 443, 444, 450; 55/490; 70/20–22, 77
See application file for complete search history.

(56) References Cited

U.S. PATENT DOCUMENTS

| 1,910,646 | A | * | 5/1933 | Starks | 137/385 |
|---|---|---|---|---|---|
| 3,217,941 | A | * | 11/1965 | Fishburne | 222/189.11 |
| 3,237,770 | A | * | 3/1966 | Humbert, Jr. | 210/94 |
| 4,804,467 | A |   | 2/1989 | Losos |  |
| 7,186,337 | B2 | * | 3/2007 | Reid | 210/232 |
| 2002/0125183 | A1 | * | 9/2002 | Chaney et al. | 210/234 |
| 2004/0074827 | A1 | * | 4/2004 | Sann et al. | 210/132 |
| 2006/0151364 | A1 | * | 7/2006 | Hacker | 210/91 |

* cited by examiner

*Primary Examiner*—Joseph W Drodge
(74) *Attorney, Agent, or Firm*—Bachman & LaPointe, P.C.

(57) ABSTRACT

A locking liquid filter assembly is disclosed that prevents an unauthorized user from removing the filter media cartridge after installation. The locking filter assembly includes a head unit for coupling with an inlet conduit for delivering unfiltered process liquid into the filter assembly and an outlet conduit for delivering filtered process liquid from the filter, a head portion that includes a manifold for communicating with the inlet conduit and with the outlet conduit, and a locking assembly coupled to the head portion configured such that when the filter media cartridge is fully engaged with the head portion, the locking assembly engages with the filter media cartridge to prevent filter media removal.

15 Claims, 6 Drawing Sheets

LOCKING FILTER ASSEMBLY

CROSS-REFERENCE TO RELATED APPLICATION

This application claims the benefit of the filing date of U.S. provisional application 60/974,233 filed on Sep. 21, 2007.

BACKGROUND OF THE INVENTION

The invention relates generally to liquid filtration devices. More particularly, the invention relates to a locking liquid filter assembly that prevents an unauthorized user from removing the filter media cartridge.

Commercial vending machines for dispensing liquids such as coffee or soft drinks typically filter the water they use before they are dispensed by passing the supply water through an appropriate filter. Filtering devices are also commonplace in water coolers, ice makers, and consumer appliances such as refrigerators for filtering drinking water and for ice production. Commercial and domestic filtering devices of this type have a limited useful life and require frequent replacement.

The replaceable filters employed in these types of filter assemblies are manufactured in accordance with particular design use specifications and performance parameters provided by the filter manufacturer. In many cases, the filter media used in such filters consists of a proprietary material or is manufactured using a proprietary process. Therefore, the filter manufacturers often recommend that replacement cartridges be purchased from the original equipment provider so as to ensure the integrity and proper operation of the filtering system.

The filter media cartridge used in typical filter assemblies is configured as either a one-piece filter cartridge that contains the filter media in a water-tight shell or a separate filter media element that slides into a water-tight cover. The filter media cartridge is coupled to a filter assembly head which directs a liquid from a supply to flow through the filter media cartridge and out to a destination for use.

However, the ease at which the filter media cartridge may be removed or replaced from a filter assembly creates a situation where tampering may just as easily take place. For filter assemblies that are not enclosed in a secured enclosure, or are exposed due to piping considerations, the filter assemblies may be tampered with. One scenario is where a hooligan removes the filter media cartridge from a filter assembly and causes a flooding situation. Another may be where the filter media cartridge is removed from a filter assembly, contaminated, and then replaced.

To ensure that the correct filter media cartridge is always used in a particular filter assembly installation and to prevent unauthorized removal, a secure filter assembly is desired.

SUMMARY OF THE INVENTION

The inventor has discovered that it would be desirable to have a locking liquid filter assembly that prevents an unauthorized user from removing the filter media cartridge after installation. Filter assemblies according to this aspect of the invention include a head portion configured to communicate with an inlet conduit for delivering unfiltered process liquid into the filter assembly and an outlet conduit for delivering filtered process liquid from the filter assembly and allows liquid to flow through the filter media cartridge, and a locking assembly coupled to the head portion configured such that when the filter media cartridge is fully engaged with the head portion, the locking assembly engages with the filter media cartridge to prevent filter media cartridge removal.

Another aspect of the invention is a locking liquid filter assembly that prevents an unauthorized user from removing the filter media cartridge after installation. Filter assemblies according to this aspect of the invention include a head portion configured to communicate with an inlet conduit for delivering unfiltered process liquid into the filter assembly and an outlet conduit for delivering filtered process liquid from the filter assembly and allows liquid to flow through the filter media cartridge, and a pair of shackle loops, one shackle loop mounted to the head portion and the other mounted to the filter media cartridge configured such that when the filter media cartridge is fully engaged with the head portion, the pair of shackle loops align for inserting a shackle of a padlock to prevent filter media cartridge removal.

Another aspect of the invention is a locking quick-change liquid filter assembly that prevents an unauthorized user from removing the filter media cartridge after installation. Filter assemblies according to this aspect of the invention include a quick-change bracket system comprising a bottom bracket having a cap portion and a mount for mounting on a surface, and a top bracket having a pivoting cap portion and a fixed portion for mounting on a surface, the bottom bracket cap portion and the top bracket cap portion having at least two liquid connectors between them and a filter media cartridge comprising a top end and a bottom end, the top end and the bottom end having liquid ports in matching correspondence with the bottom bracket cap portion and the top bracket cap portion and are adapted to couple with and fluidly seal to at least two liquid connectors, and wherein the filter media cartridge bottom end is received in the bottom bracket cap portion and the filter media cartridge top end is received in the top bracket wherein the liquid ports couple with at least two liquid connectors, and a locking assembly coupled to the top bracket pivoting cap portion configured such that when the filter media cartridge is fully engaged in the quick-change bracket system, the locking assembly engages with the top bracket fixed portion to prevent filter media cartridge removal.

The details of one or more embodiments of the invention are set forth in the accompanying drawings and the description below. Other features, objects, and advantages of the invention will be apparent from the description and drawings, and from the claims.

DETAILED DESCRIPTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items. The terms "mounted," "connected," and "coupled," are used broadly and encompass both direct and indirect mounting, connecting, and coupling. Further, "connected," and "coupled" are not restricted to physical or mechanical connections or couplings.

Figure 1:
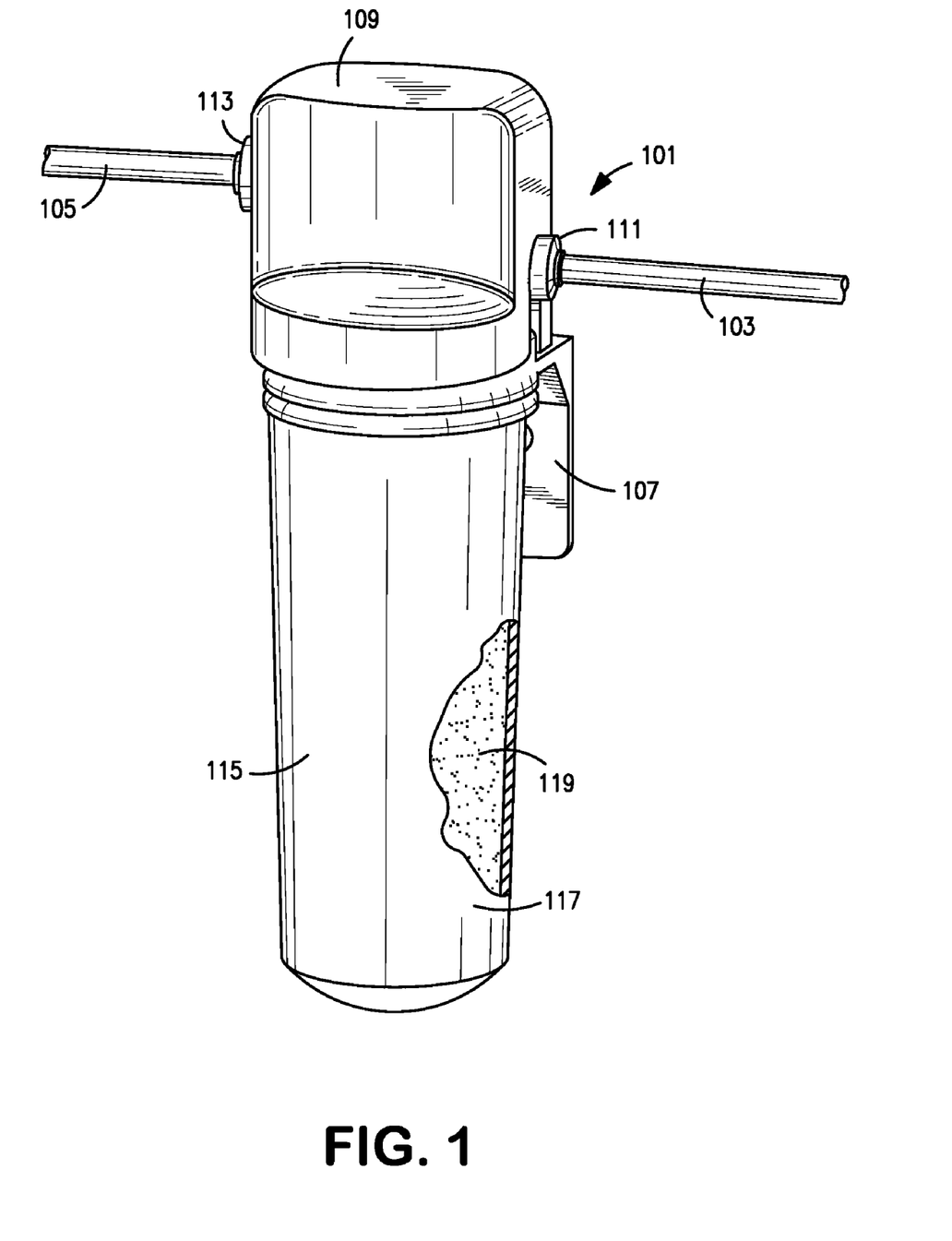
FIG. 1 is a perspective view of an exemplary liquid filter assembly.

FIG. 1 shows a typical filter assembly 101. The filter assembly 101 is configured for use in conjunction with a liquid processing system that includes an inlet conduit 103 for delivering unfiltered process liquid into the filter assembly and an outlet conduit 105 for delivering filtered process liquid from the filter 101. The filter assembly 101 is typically mounted to a supporting structure associated with the liquid processing system by a bracket 107.

The filter assembly 101 further includes a head portion 109 that includes an interior chamber or manifold having an inlet port 111 for communicating with the inlet conduit 103 and an outlet port 113 for communicating with the outlet conduit 105. The head portion 109 allows liquid to flow through a replaceable filter media cartridge 115.

Depending on the head portion configuration 109, it may include recesses for accommodating an O-ring seal to provide a water-tight seal between the head portion 109 and filter media cartridge 115, and may be provided with mating structures (not shown) that ensure compatibility when coupling the filter media cartridge 115 to the head portion 109.

The mating structures may be keyed, bayonet, or screw thread configurations. The mating structure(s) allow for easy filter media cartridge 115 installation or removal by hand, either spinning-on or spinning-off if the mating structure is screw threads, or by insertion and twisting if by bayonet or keyed mating structures. Regardless of what mating structures are employed to secure a filter media cartridge 115 to a head portion 109 of a filter assembly 101, the mating structure (s) will have a fully disengaged position where the filter media cartridge 115 is free from the head portion 109, and a fully engaged or seated position where the head portion 109 and filter media cartridge 115 become a water-tight assembly.

The replaceable filter media cartridge 115 includes a generally cylindrical body portion 117 enclosing filter media 119 for filtering process liquid. Any one of a variety of filter body portion including, for example, pleated media, microfibers, ion exchange resin, carbon block or activated carbon. An end cap (not shown) with the mating structure(s) is configured for reception with the head portion 109.

The filter media cartridge 115 may be a one-piece configuration that includes the filter media, mating structure and liquid seals, or a cover having the mating structure for enclosing a separate filter media element with liquid seals.

Figure 2:
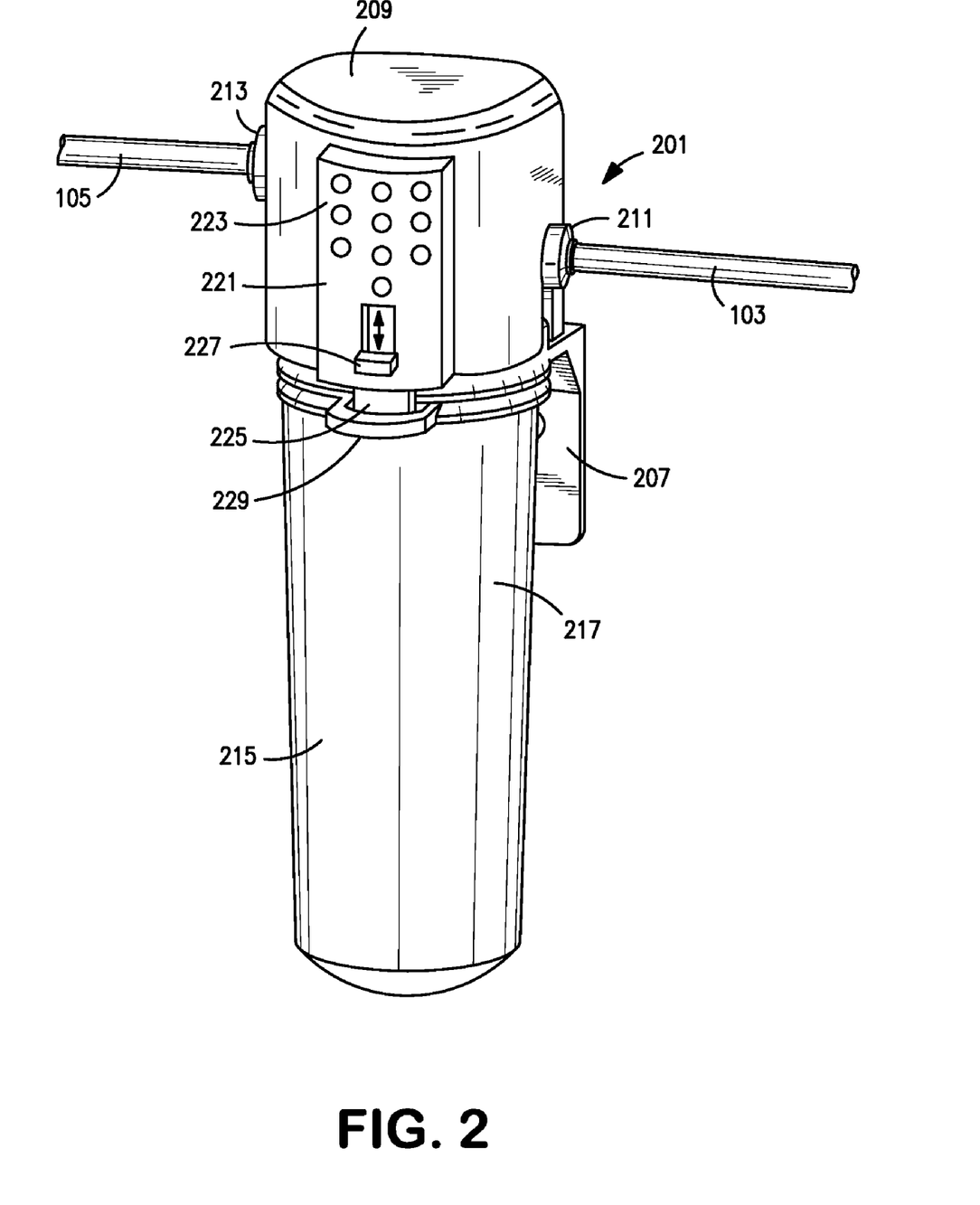
FIG. 2 is a perspective view of an exemplary locking liquid filter assembly.

FIG. 2 shows the locking filter assembly according to the invention. The filter assembly 201 includes an inlet conduit 103 for delivering unfiltered process liquid into the filter assembly and an outlet conduit 105 for delivering filtered process liquid from the filter 201. The filter assembly 201 may include a bracket 207. The filter assembly 201 further includes a head portion 209 that includes an interior chamber or manifold having an inlet port 211 for communicating with the inlet conduit 103 and an outlet port 213 for communicating with the outlet conduit 105. The head portion 209 allows liquid to flow through a replaceable filter media cartridge 215.

As described above, the head portion configuration 209 may include recesses for accommodating an O-ring seal to provide a water-tight seal between the head portion 209 and filter media cartridge 215 and may be provided with mating structures (not shown) that ensure compatibility when coupling the filter media cartridge 215 to the head portion 209. The mating structure(s) have a fully disengaged position where the filter media cartridge 215 is free from the head portion 209 and a fully engaged or seated position where the head portion 209 and filter media cartridge 215 become a water-tight assembly.

The head portion 209 further includes a locking assembly 221. The locking assembly 221 may be a mechanical combination lock, an electronic combination lock, a key operated lock (not shown), or other lock configuration. The locking assembly further includes a locking bar or bolt 225 and a locking bar finger tab 227. The locking bar tab 227 is to aid a user's purchase, if necessary, when installing or removing a filter cartridge 215. The locking bar 225 may have a bias member to allow the locking bar to retract when a filter is being removed or installed after the lock 223 is unlocked. If the locking assembly is a combination lock configuration, the locking assembly will have a keypad 223 that may include numerals 0 through 9 or alphabet characters.

The filter media cartridge 215 includes a female lock coupling 229 mounted on either the filter media cartridge 215 end cap or body 217. The end cap with the mating structure(s) (not shown) encloses a top portion of the filter media cartridge 215 body portion. The end cap portion of the filter media cartridge 215 is configured for reception with the head portion 209. The female lock coupling 229 is positioned such that the locking assembly 221 locking bar 225 slidably engages with the female lock coupling 229 in an axial direction with respect to the filter body 217 when the filter media cartridge 215 is fully engaged or seated with the head portion 209.

Since the mating structures may encompass many coupling configurations, all of the configurations will have a fully engaged or seated position to ensure a water-tight seal between the filter media cartridge 215 and filter assembly head portion 209. The locking assembly 221 locking bar 225 and filter media cartridge 215 female lock coupling 229 are aligned and engage at this position. The locking assembly 221 locking bar 225 blocks rotation between the head portion 209 and filter media cartridge 215 to prevent filter media cartridge 215 removal without first entering the correct combination code (or key) to allow the locking bar 225 to be retracted.

The locking assembly 221 is shown mounted on the surface (external) of the head portion 209. However, the locking assembly 221 may be mounted internal to the head portion 209 with the keypad 223 flush with the head portion 209 outer surface. In this configuration, the female lock coupling 229 would likewise be internal with regard to the filter media cartridge 215 end cap. Only the locking assembly 221 keypad 223 and finger tab 227 would be visible.

Figure 3:
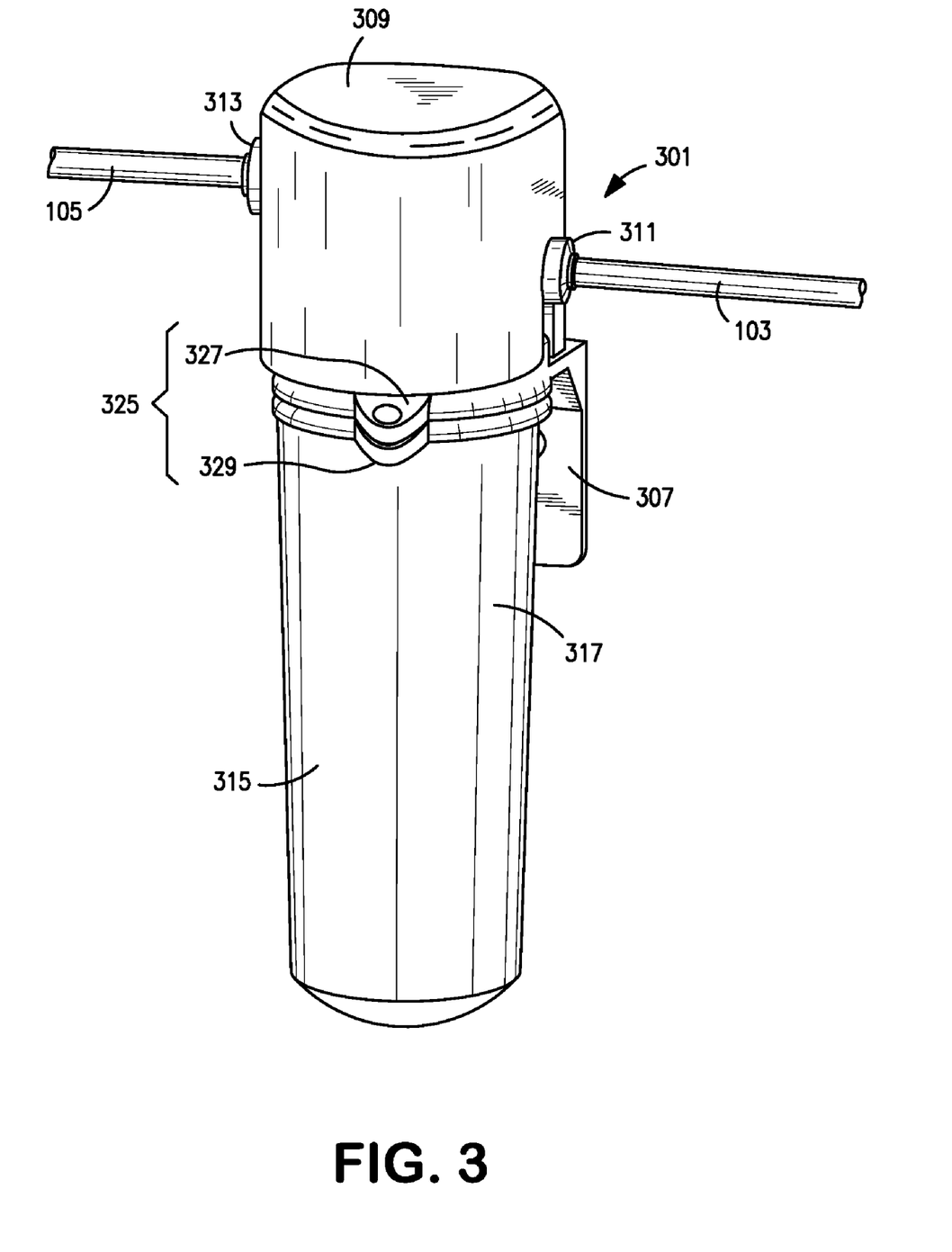
FIG. 3 is a perspective view of an exemplary liquid filter assembly having lock shackle loops.

FIG. 3 shows another locking filter assembly 301 according to the invention. The filter assembly 301 includes an inlet conduit 103 for delivering unfiltered process liquid into the filter assembly and an outlet conduit 105 for delivering filtered process liquid from the filter 301. The filter assembly 301 may include a bracket 307. The filter assembly 301 further includes a head portion 309 that includes an interior chamber or manifold having an inlet port 311 for communicating with the inlet conduit 103 and an outlet port 313 for communicating with the outlet conduit 105. The head portion 309 allows liquid to flow through a replaceable filter media cartridge 315.

The head portion configuration 309 may include recesses for accommodating an O-ring seal to provide a water-tight seal between the head portion 309 and a filter media cartridge 315 and may be provided with mating structures (not shown) that ensure compatibility when coupling the filter media cartridge 315 to the head portion 309. The mating structure(s) have a fully disengaged position where the filter media cartridge 315 is free from the head portion 309 and a fully engaged position where the head portion 309 and filter media cartridge 315 become a single, water-tight assembly.

The head portion 309 and filter media cartridge 315 includes a locking assembly 325 that comprises a head portion shackle loop 327 and a filter shackle loop 329 sized to accommodate a shackle of a padlock (not shown). Padlocks typically include a body, shackle, and a locking mechanism. The padlock locking mechanism may be a key, combination, or other configuration. The typical padlock shackle is a "U" shaped loop of metal that may be round or square in cross-section that encompasses the head portion and filter shackle loops 327, 329.

The filter media cartridge 315 shackle loop 329 is mounted on either the filter media cartridge 315 end cap or body 317. The end cap with mating structure(s) (not shown) encloses a top portion of the filter media cartridge 315 body portion. The end cap portion of the filter media cartridge 315 is configured for reception with the head portion 309. The filter shackle loop 329 is positioned such that the loop 329 and head portion shackle loop 327 align when the filter media cartridge 315 is fully engaged with the head portion 309.

Since the mating structures may encompass many coupling configurations, all of the configurations will have a fully engaged or seated position to ensure a water-tight seal between the filter media cartridge 315 and filter assembly head portion 309. The head portion shackle loop 327 and filter cartridge shackle loop 329 are aligned at this position such that a padlock shackle may be inserted through both the head portion shackle loop 327 and filter media cartridge shackle loop 329 blocking rotation between the head portion 309 and filter media cartridge 315 to prevent filter media cartridge 315 removal without first removing the padlock.

Locking assembly may also be applied to modular filter assemblies that hold one or more filter media cartridges in quick-change brackets such as those taught by Reid (U.S. Pat. No. 7,186,337 B2). The quick-change brackets typically include conduits for flow in or out of one or both ends of the quick-change brackets and into or out of a filter media cartridge.

The quick-change bracket systems comprise a pair of brackets—a top bracket and a bottom bracket. Each bracket pair captures a top end and a bottom end of a filter media cartridge. Fittings are included in one or both bracket end caps for sealing to inlet and outlet ports of the filter media cartridge, and to connect the ports to supply and distribution conduits. The top and bottom brackets typically have a fixed mount that attaches to a mounting surface and do not move, and a pivoting cap portion that moves to allow a filter cartridge to be installed or removed. To install or remove a filter cartridge, one or both brackets must pivot outwards away from the mounting surface.

To prevent unauthorized removal of a filter media cartridge that is used in a quick-change bracket system, the top bracket and/or bottom bracket must not be allowed to pivot outwards after a cartridge is installed.

The locking assembly shown in FIG. 2 may be adapted to a quick-change bracket system by positioning the locking assembly on the pivoting cap portion of a bracket such that the locking bar extends in a radial direction with respect to the filter body towards the mounting surface.

Figure 4A:
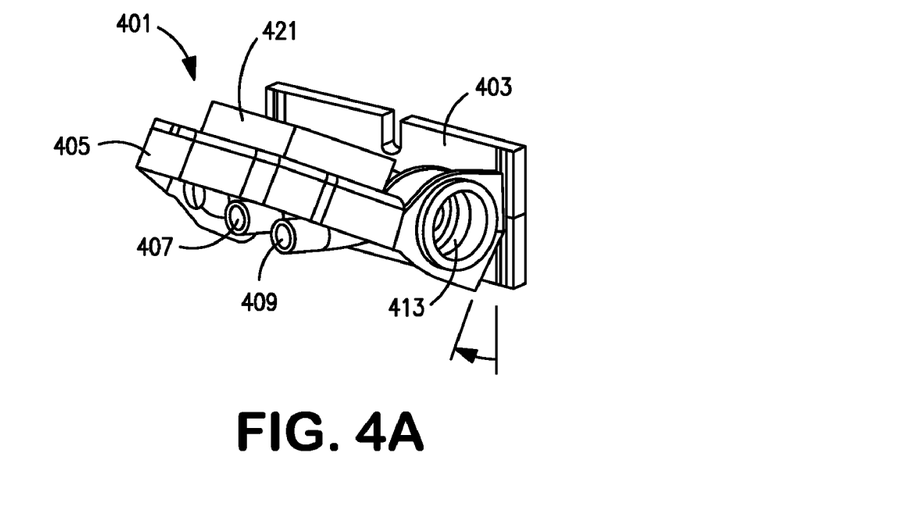
FIG. 4A is a perspective view of an exemplary quick-change locking top bracket in an open position.
Figure 4B:
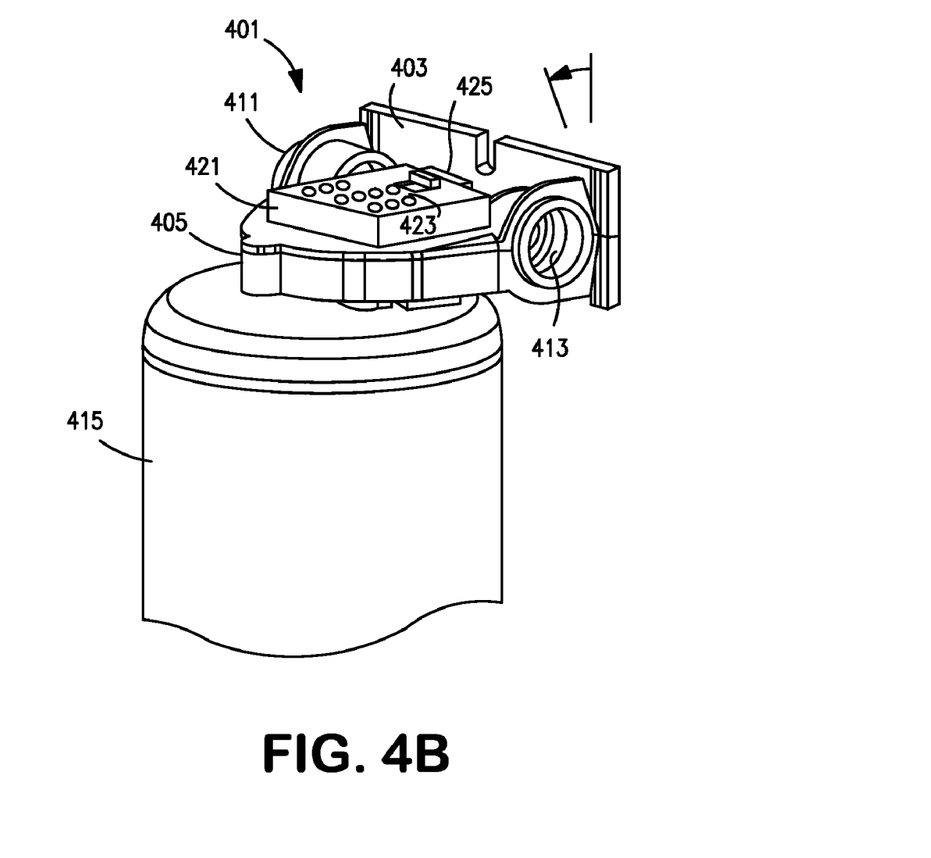
FIG. 4B is the quick-change locking top bracket shown in FIG. 4A in a locked position coupled to a filter media cartridge.

FIGS. 4A and 4B show a quick-change locking top bracket 401. The top bracket has a fixed mount 403 that is attached to a mounting surface and a pivoting cap portion 405 that moves to allow a filter cartridge 415 to be installed or removed. The exemplary locking top bracket 401 includes two connectors 407, 409 for coupling with inlet and outlet ports (not shown) of the filter media cartridge 415 and to supply 411 and distribution 413 conduits.

The locking assembly 421 blocking lever 425 butts against the top bracket fixed mount 403 when in an extended position. The blocking lever 425 prevents the top cap portion from pivoting outward, thereby prohibiting filter media cartridge removal (or installation). FIG. 4B shows the top bracket 401 cap portion 405 in a locked position with the blocking lever 425 extended. To remove a filter media cartridge 415 from a quick-change locking bracket, the correct combination must be entered on the keypad 423 and the blocking lever 425 retracted as shown in FIG. 4A.

Figure 5A:
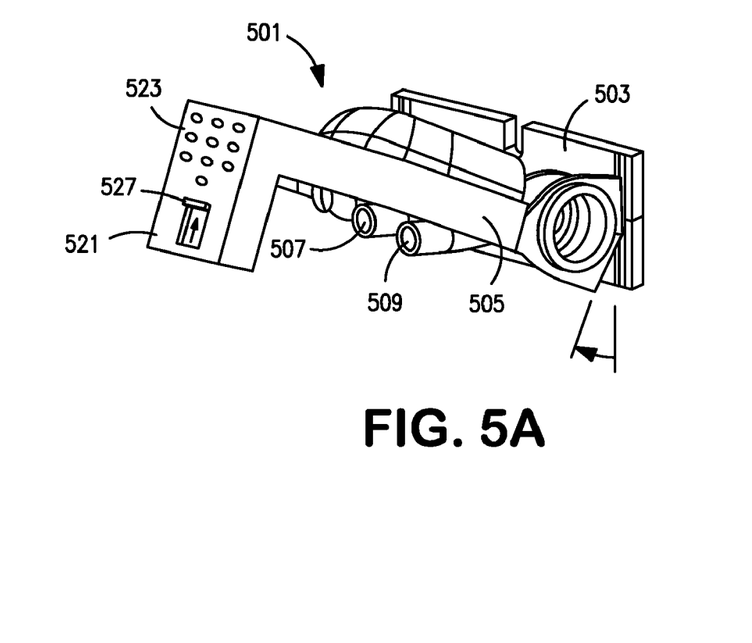
FIG. 5A is a perspective view of another exemplary quick-change locking top bracket in an open position.
Figure 5B:
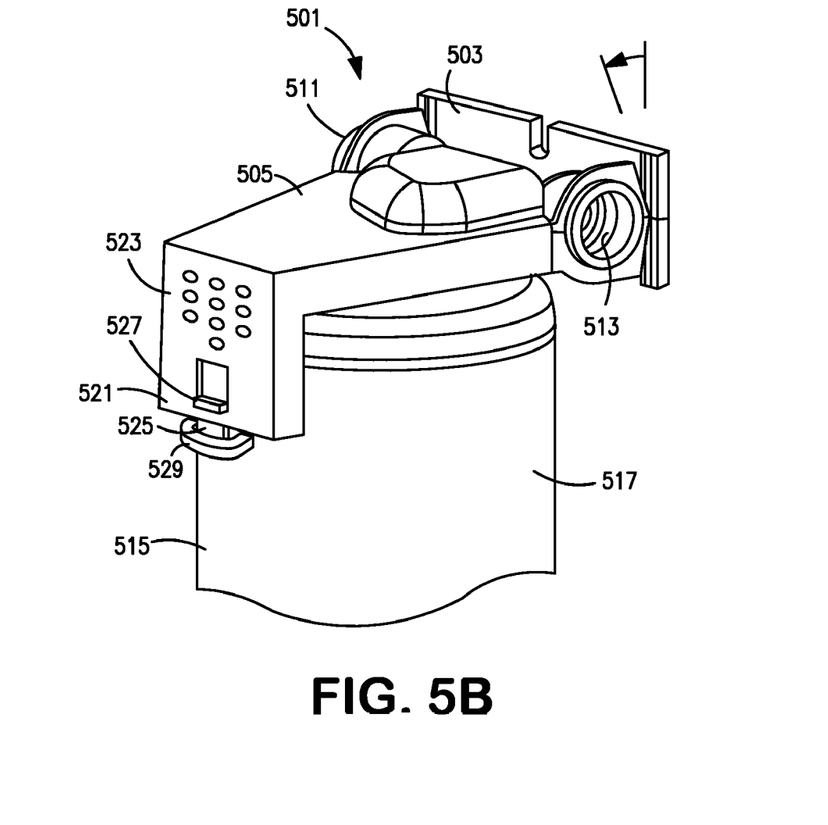
FIG. 5B is the quick-change locking top bracket shown in FIG. 5A in a locked position coupled to a filter media cartridge.

FIGS. 5A and 5B show another quick-change locking top bracket 501 embodiment. The top bracket has a fixed mount 503 that is attached to a mounting surface and a pivoting cap portion 505 that moves to allow a filter cartridge 515 to be installed or removed. The exemplary locking top bracket 501 includes two connectors 507, 509 for coupling with inlet and outlet ports (not shown) of the filter media cartridge 515 and to supply 511 and distribution 513 conduits.

The pivoting cap portion 505 further includes a locking assembly 521. The locking assembly 521 may be a mechanical combination lock, an electronic combination lock, a key operated lock (not shown), or other lock configuration. The locking assembly further includes a locking bar or bolt 525 and a locking bar finger tab 527. The locking bar tab 527 is to aid a user's purchase, if necessary, when installing or removing a filter cartridge 515. The locking bar 525 may have a bias member to allow the locking bar to retract when a filter is being removed or installed after the locking assembly 521 is unlocked. If the locking assembly is a combination lock configuration, the locking assembly will have a keypad 523 that may include numerals 0 through 9 or alphabet characters.

The filter media cartridge 515 includes a female lock coupling 529 mounted on the filter media cartridge 515. The female lock coupling 529 is positioned such that the locking assembly 521 locking bar 525 slidably engages with the female lock coupling 529 in an axial direction with respect to the filter media cartridge 515 is fully engaged or seated with the two connectors 507, 509, and the pivoting cap portion 505 is fully pivoted in a closed position.

The locking assembly 521 locking bar 525 couples with the female lock coupling 529 on the filter media cartridge 515 when in an extended position. The locking bar 525 prevents the top cap portion 505 from pivoting outward, thereby prohibiting filter media cartridge removal (or installation). FIG. 5B shows the top bracket 501 cap portion 505 in a locked position with the locking bar 525 extended. To remove a filter media cartridge 515 from a quick-change locking bracket, the correct combination must be entered on the keypad 523 and the locking bar 525 retracted as shown in FIG. 5A.

Figure 6:
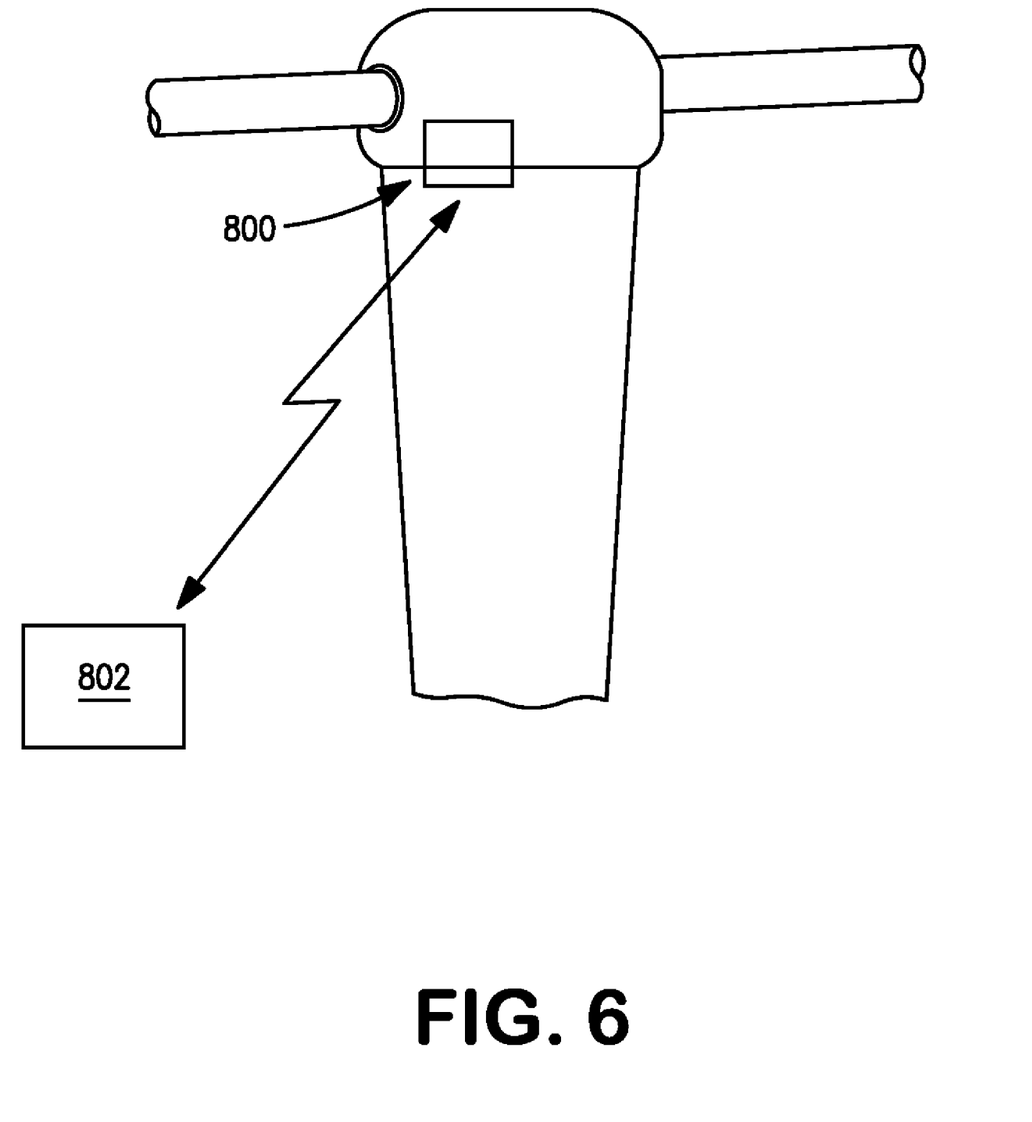
FIG. 6 is a schematic illustration of an alternate embodiment of the invention including an alarm feature.

FIG. 6 illustrates a further embodiment of the invention wherein the filter assembly according to any of the embodiments disclosed herein can be provided with communication ability to allow an alarm when certain actions are taken. This can be accomplished using any of numerous alarm members schematically illustrated at 800, which could be any type of triggered communication unit the structure and operation of which would be well known to persons of ordinary skill in the art. Alarm member 800 can be adapted to communicate with a remote station 802 as illustrated in FIG. 6, and this remote station can be a central monitoring facility, or a particular caretaker or other individual, or the like. This alarm can be set to be triggered any time that the filter assembly is opened, for example by lack of contact between two contacts on the upper and lower components of the filter assembly. When an alarm is received in this embodiment, personnel at the monitoring facility can check to make sure that an authorized person is the one accessing the filter assembly. Alternatively, the alarm can be set to be deactivated by entering the proper code and/or using a key to open the lock in an authorized manner. Under those circumstances, an alarm would indicate unauthorized access to the filter assembly. Alternatively, the alarm could be a simple noise generating alarm intended to scare of an individual, without the need for communication ability.

In the embodiment of FIG. 6, any expensive components of the alarm member should be incorporated into the upper or head portion of the filter assembly, since this part of the device is designed to last a long time, for example in excess of 20 years, and so expensive components are best built into this component of the assembly. In the context of a monitoring function, the alarm member can also be configured to do some local monitoring and send an alarm when maintenance is needed. Examples of this type of monitoring could be to include a sensor checking filter color, for example, or a simple time counter which indicates when an amount of time has elapsed which is the normally recommended time for replacement of the filter. Of course, this type of maintenance may be more easily incorporated into a central monitoring station as well, depending upon the sophistication of the monitoring station itself.

It should be appreciated that the embodiment of FIG. 6 can be used to greatly increase the security provided by the present invention, and that this can be very useful in many water delivery systems, for example in food service buildings and the like.

One or more embodiments of the present invention have been described. Nevertheless, it will be understood that various modifications may be made without departing from the spirit and scope of the invention. Accordingly, other embodiments are within the scope of the following claims.

What is claimed is:

1. A locking liquid filter assembly, comprising:
   a head portion configured to communicate with an inlet conduit for delivering unfiltered process liquid into the filter assembly and an outlet conduit for delivering filtered process liquid from the filter assembly and allow liquid to flow through a filter media cartridge; and
   a locking assembly coupled to the head portion configured to engage a coupling mounted at the filter media cartridge such that when the filter media cartridge is fully engaged with the head portion, the locking assembly engages with the filter media cartridge to prevent unauthorized filter media cartridge removal.

2. The locking liquid filter assembly according to claim 1 wherein the filter media cartridge is selected from the group consisting of a replaceable one-piece cartridge, a filter media element and cover configuration or combinations thereof.

3. The locking liquid filter assembly of claim 1, further comprising an alarm member communicated with the head portion and the filter media cartridge to issue a signal when the filter media cartridge is moved to a disengaged position with respect to the head portion.

4. The locking liquid filter assembly according to claim 1 wherein the locking assembly is selected from the group consisting of a mechanical combination lock, an electronic combination lock, a key operated lock or combinations thereof.

5. The locking liquid filter assembly according to claim 4, wherein the locking assembly further includes a locking bar and a locking bar finger tab.

6. A locking liquid filter assembly, comprising:
   a head portion configured to communicate with an inlet conduit for delivering unfiltered process liquid into the filter assembly and an outlet conduit for delivering filtered process liquid from the filter assembly and allow liquid to flow through a filter media cartridge; and
   a locking assembly comprising a pair of shackle loops, one shackle loop mounted to the head portion and the other mounted to the filter media cartridge configured such that when the filter media is fully engaged with the head portion, the pair of shackle loops align for inserting a shackle of a padlock to prevent unauthorized filter media cartridge removal.

7. The locking liquid filter assembly according to claim 6 further comprising an alarm member communicated with the head portion and the filter media cartridge to issue a signal when the filter media cartridge is moved to a disengaged position with respect to the head portion.

8. A locking quick-change liquid filter assembly, comprising:
   a quick-change bracket system comprising:
      a bottom bracket having a cap portion and a mount for mounting on a surface; and
      a top bracket having a pivoting cap portion and a fixed portion for mounting on a surface; the bottom bracket cap and the top bracket cap portion having at least two liquid connectors between them and
   a filter media cartridge comprising:
      a top end and a bottom end, the top end and the bottom end having liquid ports in matching correspondence with the bottom bracket cap portion and the top bracket cap portion and are adapted to couple with and fluidly seal to at least two liquid connectors, and wherein the filter media cartridge bottom end is received in the bottom bracket cap portion and the filter media cartridge top end is received in the top bracket wherein the liquid ports couple with the at least two liquid connectors; and
   a locking assembly coupled to the top bracket pivoting cap portion configured such that when the filter media cartridge is fully engaged in the quick-change bracket system, the locking assembly engages with the top bracket fixed portion to prevent unauthorized filter media cartridge removal.

9. The locking quick-change liquid filter assembly according to claim 8 further comprising an alarm member communicated with the cap portion and the filter media cartridge to issue a signal when the filter media cartridge is moved to a disengaged position with respect to the cap portion.

10. The locking quick-change liquid filter assembly according to claim 8 wherein the locking assembly is selected from the group consisting of a mechanical combination lock, an electronic combination lock, a key operated lock or combinations thereof.

11. The locking quick-change liquid filter assembly according to claim 10, wherein the locking assembly further includes a locking bar and a locking bar finger tab.

12. A locking quick-change liquid filter assembly, comprising:
- a quick-change bracket system comprising:
  - a bottom bracket having a cap portion and a mount for mounting on a surface; and
  - a top bracket having a pivoting cap portion and a fixed portion for mounting on a surface; the bottom bracket cap and the top bracket cap portion having at least two liquid connectors between them and
- a filter media cartridge comprising:
  - a top end and a bottom end, the top end and the bottom end having liquid ports in matching correspondence with the bottom bracket cap portion and the top bracket cap portion and are adapted to couple with and fluidly seal to at least two liquid connectors, and wherein the filter media cartridge bottom end is received in the bottom bracket cap portion and the filter media cartridge top end is received in the top bracket wherein the liquid ports couple with the at least two liquid connectors; and
- a locking assembly coupled to the top bracket pivoting cap portion configured such that when the filter media cartridge is fully engaged in the quick-change bracket system, the locking assembly engages with the filter media cartridge to prevent unauthorized filter media cartridge removal.

13. The locking quick-change liquid filter assembly according to claim 12 further comprising an alarm member communicated with the cap portion and the filter media cartridge to issue a signal when the filter media cartridge is moved to a disengaged position with respect to the cap portion.

14. The locking quick-change liquid filter assembly according to claim 12 wherein the locking assembly is selected from the group consisting of a mechanical combination lock, an electronic combination lock, a key operated lock or combinations thereof.

15. The locking quick-change liquid filter assembly according to claim 14, wherein the locking assembly further includes a locking bar and a locking bar finger tab.

* * * * *